(12) United States Patent
Acar et al.

(10) Patent No.: US 10,164,531 B2
(45) Date of Patent: Dec. 25, 2018

(54) ADAPTIVE CONTROL METHOD FOR GENERATING NON OVERLAPPING TIME IN OUTPUT DEVICES

(71) Applicant: Dialog Semiconductor (UK) Limited, London (GB)

(72) Inventors: Turev Acar, Istanbul (TR); Emre Topcu, Istanbul (TR); Kemal Ozanoglu, Istanbul (TR); Marinus Wilhelmus Kruiskamp, 's-Hertogenbosch (NL)

(73) Assignee: Dialog Semiconductor (UK) Limited, London (GB)

( * ) Notice: Subject to any disclaimer, the term of this patent is extended or adjusted under 35 U.S.C. 154(b) by 0 days.

(21) Appl. No.: 15/432,953

(22) Filed: Feb. 15, 2017

(65) Prior Publication Data

US 2018/0234016 A1   Aug. 16, 2018

(51) Int. Cl.
| | | |
|---|---|---|
| *H02M 3/158* | (2006.01) | |
| *H02M 1/08* | (2006.01) | |
| *H02M 1/38* | (2007.01) | |
| *H02M 3/155* | (2006.01) | |
| *H02M 1/00* | (2006.01) | |

(52) U.S. Cl.
CPC ............ *H02M 3/158* (2013.01); *H02M 1/08* (2013.01); *H02M 1/38* (2013.01); *H02M 3/1588* (2013.01); *H02M 3/155* (2013.01); *H02M 2001/0009* (2013.01)

(58) Field of Classification Search
CPC .... H02M 3/156; H02M 3/158; H02M 3/1588; H02M 3/155; H02M 3/1582; H02M 3/157; H02M 3/1563; H02M 2003/1566; H02M 2003/1557; H02M 2001/0012; H02M 2001/0009; H04B 2215/069
See application file for complete search history.

(56) References Cited

U.S. PATENT DOCUMENTS

| | | | |
|---|---|---|---|
| 8,289,010 B1 | 10/2012 | Fernald et al. | |
| 8,648,583 B2 | 2/2014 | Brown et al. | |
| 2009/0160412 A1* | 6/2009 | Latham | H02M 3/1588 323/282 |
| 2012/0212195 A1* | 8/2012 | Kushida | H02M 3/1588 323/271 |

(Continued)

OTHER PUBLICATIONS

Sattar Abdus. "http://www.ixys.com/Documents/AppNotes/IXAN0061.pdf". IXYS Corporation. p. 2.*

(Continued)

*Primary Examiner* — Bryan R Perez
(74) *Attorney, Agent, or Firm* — Saile Ackerman LLC; Stephen B. Ackerman

(57) ABSTRACT

The disclosure describes an adaptive technique for generating minimum dead time in a DC-DC switching power converter, while ensuring no short circuit losses occur, resulting in efficiency improvement of the switching converter. In addition, this adaptive scheme makes sure that even the ambient conditions of the switching converter give the best decision at the ON/OFF timings of the switches. Body diode conduction feedback is detected, with reduced process sensitivity, and an algorithm is disclosed that finds the minimum dead time for a given load current, temperature, and process conditions.

23 Claims, 10 Drawing Sheets

(56) References Cited

U.S. PATENT DOCUMENTS

2013/0147458 A1* 6/2013 Zhak .................. G05F 3/08
                                                    323/311
2014/0062433 A1  3/2014 Zhou et al.
2017/0179887 A1* 6/2017 Henzler ............... H03F 1/0216

OTHER PUBLICATIONS

"Accurate Dead-Time Control for Synchronous Buck Converter With Fast Error Sensing Circuits," by Sungwoo Lee et al., IEEE Transactions on Circuits and Systems—I: Regular Papers, vol. 60, No. 11, Nov. 2013, pp. 3080-3089.

"94.6% Peak Efficiency DCM Buck Converter with Fast Adaptive Dead-Time Control," by Sujan K. Manohar et al., (ESSCIRC), 2013, IEEE Proceedings of the ESSCIRC, Sep. 16-20, 2013, 4 pgs.

"A Low-Voltage CMOS DC-DC Converter for a Portable Battery-Operated System," by Anthony J. Stratakos et al., 25th Annual Power Electronics Specialists Conference, PESC '94 Record., Jun. 20-25, 1994, pp. 619-626.

* cited by examiner

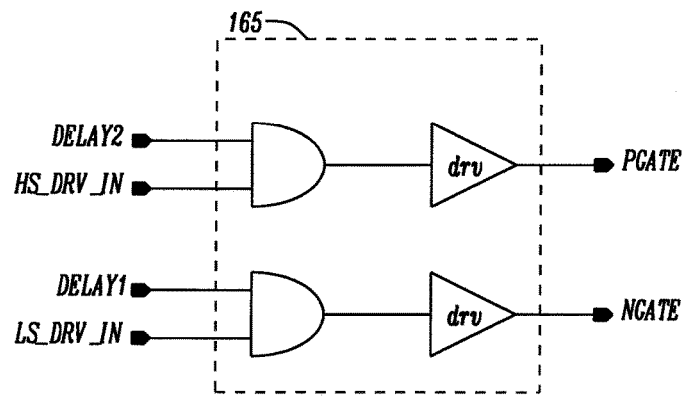
FIG. 1b
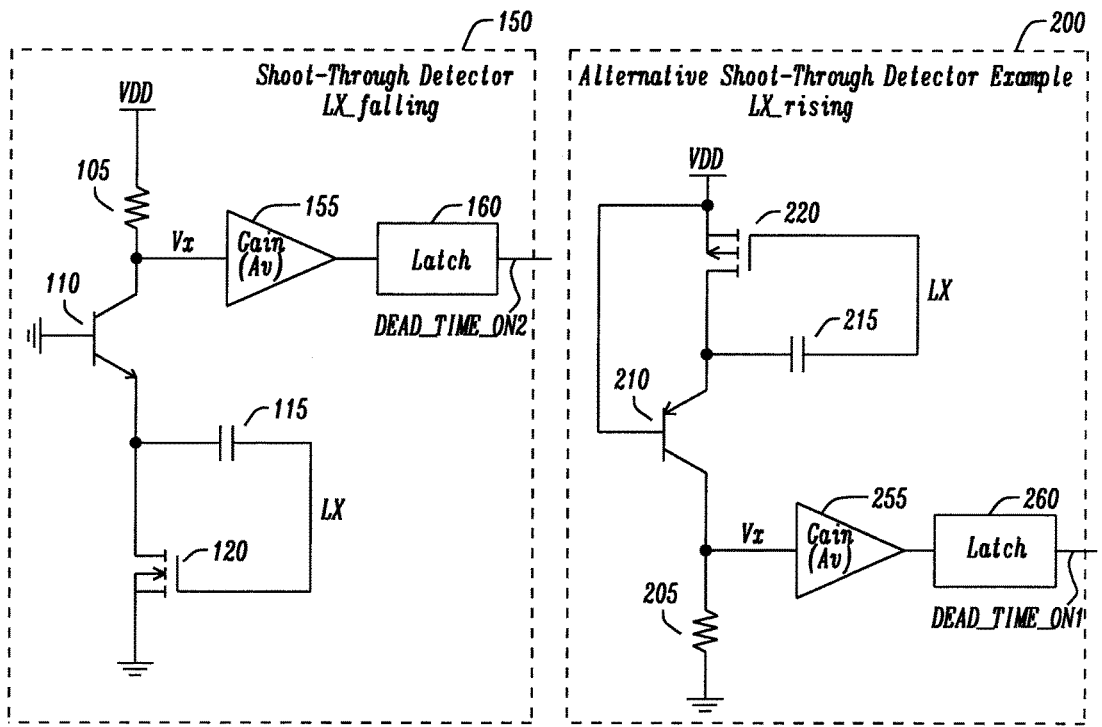
FIG. 2a
FIG. 2b

ADAPTIVE CONTROL METHOD FOR GENERATING NON OVERLAPPING TIME IN OUTPUT DEVICES

BACKGROUND OF THE INVENTION

Field of the Invention

The disclosure relates generally to a DC-DC switching power converter, employing dead time in the ON/OFF timings of high and low side devices at the output of the converter.

Description of Related Art

Synchronous switching converters employ high and low side switches. It is a design precaution that these switches should never be ON at the same time, or a short circuit condition may occur. Even though there is no short circuit condition, there may be a shoot-through current case, which causes inefficiency in the switching converter. Thus when changing switch states, switching converters employ a break before make condition, where both high and low side switches are off, commonly called dead time. This occurs between the turn-off of the high-side switch and the turn-on of the low-side switch, when the body diode of the low-side switch conducts the output current, and both switches are simultaneously turned on. This can also occur between the turn-off of the low-side switch and the turn-on of the high-side switch, when the body diode of the high-side switch conducts the output current, and both switches are simultaneously turned on. During dead time, coil current flows through the body diode of the switches, resulting in an efficiency loss of up to 5 to 7%.

One technique of the prior art employs pass device gate voltages as feedback information for non-overlapping time, and targets to match pass device gate voltage transients. This scheme is not very effective, as it does not guarantee that short circuit does not occur. The technique is sensitive to delay mismatch across process, temperature, voltage, and parasitic capacitances in the design, and it does not guarantee a minimum dead time.

Another technique of the prior art makes use of an operational transconductance amplifier based comparator, to detect body diode conduction and logic circuitry to end dead time after detection. This technique is not efficient, as the delays associated with the comparator, logic cells, and drivers contribute to significant delay time, resulting in slow response of the circuit and efficiency loss.

SUMMARY OF THE INVENTION

An object of the disclosure is to minimize 'dead-time' for the high-side and low-side switches at the output of DC-DC switching converters and Class-D amplifiers.

A further object is to improve the efficiency of DC-DC switching converters and Class-D amplifiers.

A still further object is to adaptively minimize dead time of output switches with tolerance to variability in process and temperature.

A further object of the disclosure is to provide a DC-DC switching power converter that adaptively generates a non-overlapping time between the high side and low side output devices.

Further, another object of is a shoot-through detection scheme, having fast response, process intolerance, and little power consumption.

A still further object is an algorithm to adaptively, and continuously, determine the minimum dead time, when both the high side and low side device of the switching converter are off, for given load current, temperature, supply and process conditions.

To accomplish the above and other objects, a switching device, having adaptively minimized dead times, when changing output switch states, is disclosed. The switching device comprises high-side and low-side switches, a shoot-through detector, and adaptive circuitry, connected to the shoot-though detector, configured to adaptively minimize the dead time. The shoot-through detector further comprises an input which is the common output of the switching device, a bipolar device, configured to sense a rising or falling edge of the common output, and a latch configured to change state based on the rising or falling edge, and to output a dead_time-on pulse having a duration of a current dead time. The switching device further comprises a programmable delay cell connected to the adaptive circuitry, and driver logic connected to the programmable delay cell.

The above and other objects are further achieved by a method of adaptively minimizing dead times when changing output switch states of a switching device. The steps include providing high-side and low-side switches, connected together at a common output of the switching device. A body diode at one of the switches conducts current during the dead time, when both of the switches are off. The current is detected from the body diode with a shoot-through detector. The dead time is adaptively minimized, using adaptive circuitry connected to the shoot-though detector.

In various embodiments, the function may be achieved with a shoot-through detector configured for the falling edge of the common output of the switching device, with an NPN transistor and an N channel MOSFET.

In various embodiments, the function may be achieved with a shoot-through detector configured for the rising edge of the common output of the switching device, with a PNP transistor and a P channel MOSFET.

In various embodiments, the function may be achieved with a programmable delay cell comprising a current DAC, switched current mirrors, and a capacitor.

In various embodiments, the function may be achieved with a programmable delay cell comprising a delay mechanism other than a current DAC.

In various embodiments, the function may be achieved with a synchronous switching converter.

In various embodiments, the function may be achieved with a class-D amplifier.

BRIEF DESCRIPTION OF THE DRAWINGS

FIG. 1b illustrates a diagram of the driver logic for the DC-DC switching converter of FIG. 1a, embodying the principles of the disclosure.

FIG. 2a illustrates a diagram of a shoot-through detector for a DC-DC switching converter, for high side device dead time detection, embodying the principles of the disclosure.

FIG. 2b illustrates a diagram of an alternative shoot-through detector for a DC-DC switching converter, for low side device dead time detection, embodying the principles of the disclosure.

DETAILED DESCRIPTION OF THE INVENTION

The disclosure describes an adaptive technique for generating minimum dead time, while ensuring no short circuit losses occur, for output devices for switching converters or class-D amplifiers. In addition, this adaptive scheme makes sure that even the ambient conditions of the switching converter give the best decision at the ON/OFF timings of the switches. Body diode conduction feedback is detected, with reduced process sensitivity, and an algorithm is disclosed that finds the minimum dead time for a given load current, temperature, and process conditions.

Figure 1A:
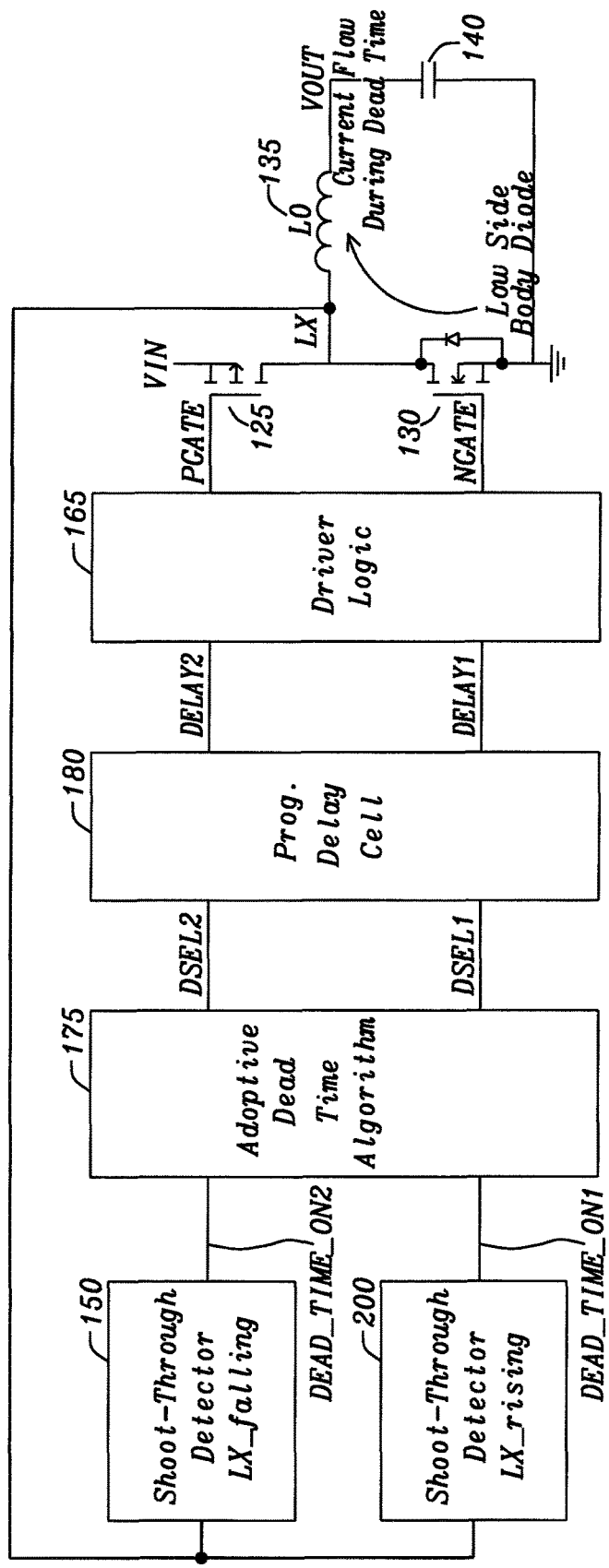
FIG. 1a illustrates a diagram of a DC-DC switching converter, for high side and low side device dead time detection, embodying the principles of the disclosure.

FIG. 1a illustrates diagram 100 of a DC-DC switching converter, for high side and low side device dead time detection, embodying the principles of the disclosure. Adaptive Dead time Algorithm 175 receives DEAD_TIME_ON2 from Shoot-Through Detector 150 for LX_falling, and DEAD_TIME_ON1 from Shoot-Through Detector 200 for LX_rising, where LX is the drain node voltage of the high side and low side devices. The adaptive dead time algorithm generates DSEL2, to delay high side device 125 from switching, and DSEL1, to delay low side device 130 from switching. Both DSEL2 and DSEL1 are input to Programmable Delay Cell 180. The programmable delay cell provides DELAY2, to the high side device controls, and DELAY1, to the low side device controls, in Driver Logic 165. Outputs of the driver logic include PGATE, the driver control signal for device 125, and NGATE, the driver control signal for device 130. During the dead time, body diode conduction is observed in the low side device, and current flows through inductor L0 135. Output voltage VOUT is observed across capacitor 140.

The adaptive dead time delay signals are generated by the programmable delay cell. In the example of FIG. 1a, a 6-bit DAC may be used to adjust the delay, and the same delay may be achieved by any other delay mechanism. The proposed disclosure ensures the two pass devices, high side device 125 and low side device 130, are not conducting at the same time. The driver signal in the switch converter that is normally used to turn on each pass device is delayed by an adaptive delay in driver logic 165. Dead time algorithm 175 determines the adaptive delay, by means of programmable delay cell 180, such that the pass device turns on at the desired time.

FIG. 1b illustrates diagram 165 of the driver logic for the DC-DC switching converter of FIG. 1a. The driver logic can be any one of those that is implemented in a Switching Mode Power Supply (SMPS). HS_DRV_IN is a voltage supply input, used in setting the state of the high side device, and LS_DRV_IN a voltage supply input, used in setting the state of the low side device. The programmable delay cell provides DELAY2, to delay high side device switching, and DELAY1, to delay low side device switching, of the driver logic. Outputs of the driver logic are PGATE, the control signal for the high side device, and NGATE, the control signal for the low side device.

FIG. 2a illustrates diagram 150 of a shoot-through detector for a DC-DC switching converter, for high side device dead time detection. The shoot-through detector for LX_falling is formed with common base NPN transistor 110, whose collector is connected to $V_{DD}$ across resistor 105, and whose emitter is connected to LX node across capacitance 115, and to the drain of NMOS device 120. When body diode conduction occurs in the low side device, during the non-overlapping time of high side device 125 and low side device 130, the shunt capacitance will pull down the emitter of the NPN transistor to an amplified lower value. The capacitance is charged to $V_{DD}$ when LX node is rising, and will see a change in voltage greater than $V_{DD}$, after the LX node rising edge transition. The output of the detector will be amplified in gain 155, latched in 160, and sent as DEAD_TIME_ON2 to dead time algorithm 175.

FIG. 2b illustrates diagram 200 of an alternative shoot-through detector for a DC-DC switching converter, for low side switch dead time detection. The shoot-through detector for LX_rising is formed with PNP transistor 210, whose collector is connected to ground across resistor 205, whose emitter is connected to LX node across capacitance 215 and to the drain of PMOS device 220, and whose source is connected to $V_{DD}$. When body diode conduction occurs in the high side device, during the non-overlapping time of high side device 125 and low side device 130, the capacitance will pull up the emitter of the PNP transistor to an amplified higher value. The capacitance is charged to $V_{DD}$ when LX node is falling low, and will see a change in voltage less than $V_{DD}$ after the LX node falling edge transition. The output of the detector will be amplified in gain 255, latched in 260, and sent as DEAD_TIME_ON1 to adaptive dead time algorithm 175.

NPN and PNP transistors, in the high side and low side device shoot-through detectors, respectively, have the advantage of speed and process intolerance, during the body diode conduction period. The LX node sees a diode voltage drop detected more accurately with a bipolar junction.

Figure 3:
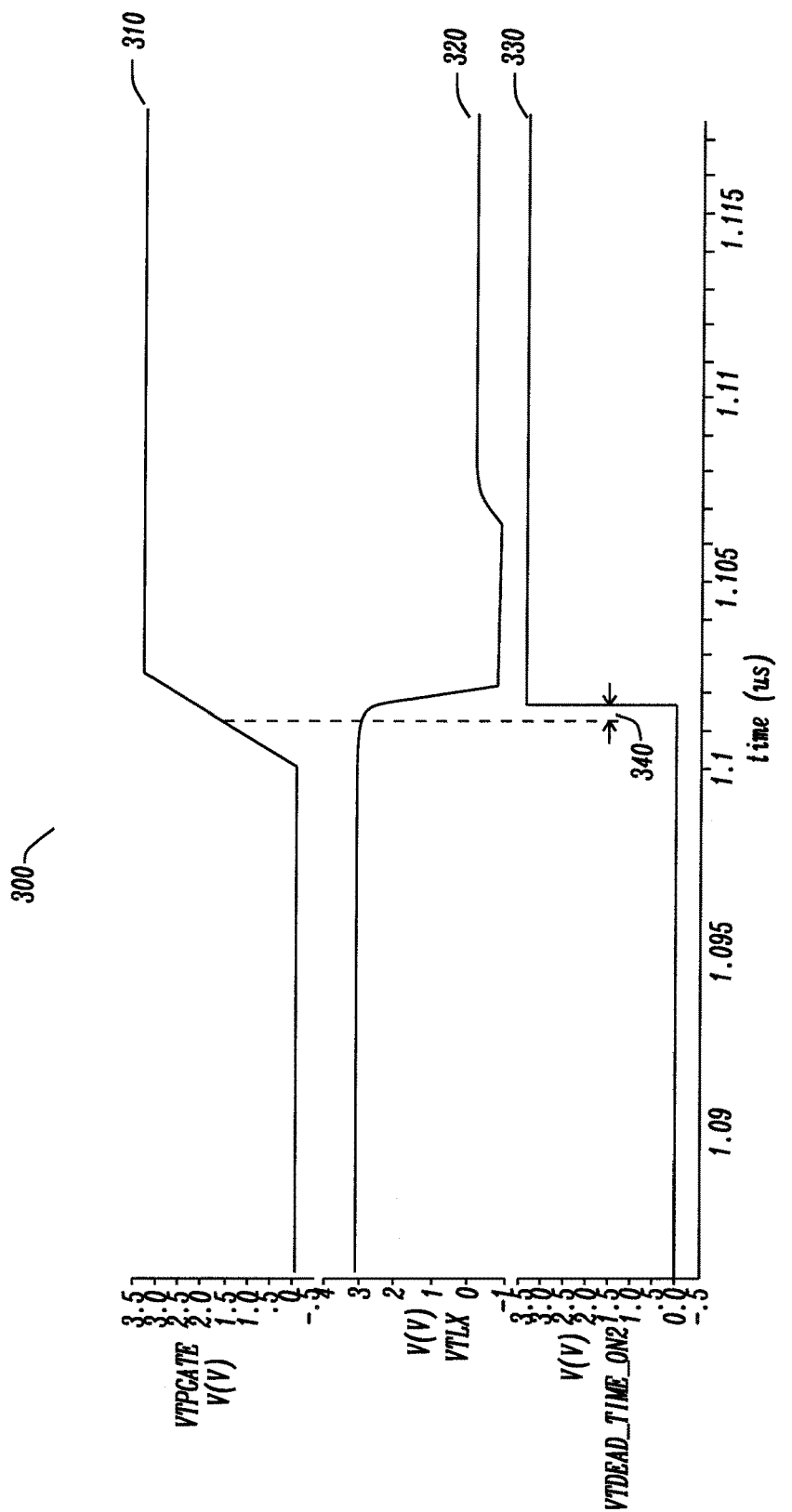
FIG. 3 shows simulation results for the high side device dead time detection of FIG. 1a, turning off when compared to voltage on the LX node, embodying the principles of the disclosure.

FIG. 3 shows simulation results 300 for the high side device dead time detection when turning off, in FIG. 1a, compared to the voltage on the LX node. Signal waveform 310 represents high side control voltage VTPGATE, signal waveform 320 node voltage LX, and signal waveform 330 high side dead time on voltage VTDEAD_TIME_ON2. A propagation delay, 340, of 0.45 ns is measured between the high side device turning off when VTPGATE rises, and the output LX falling. VTDEAD_TIME_ON2 represents the output of shoot-through detector 200 for the high side device.

Figure 4:
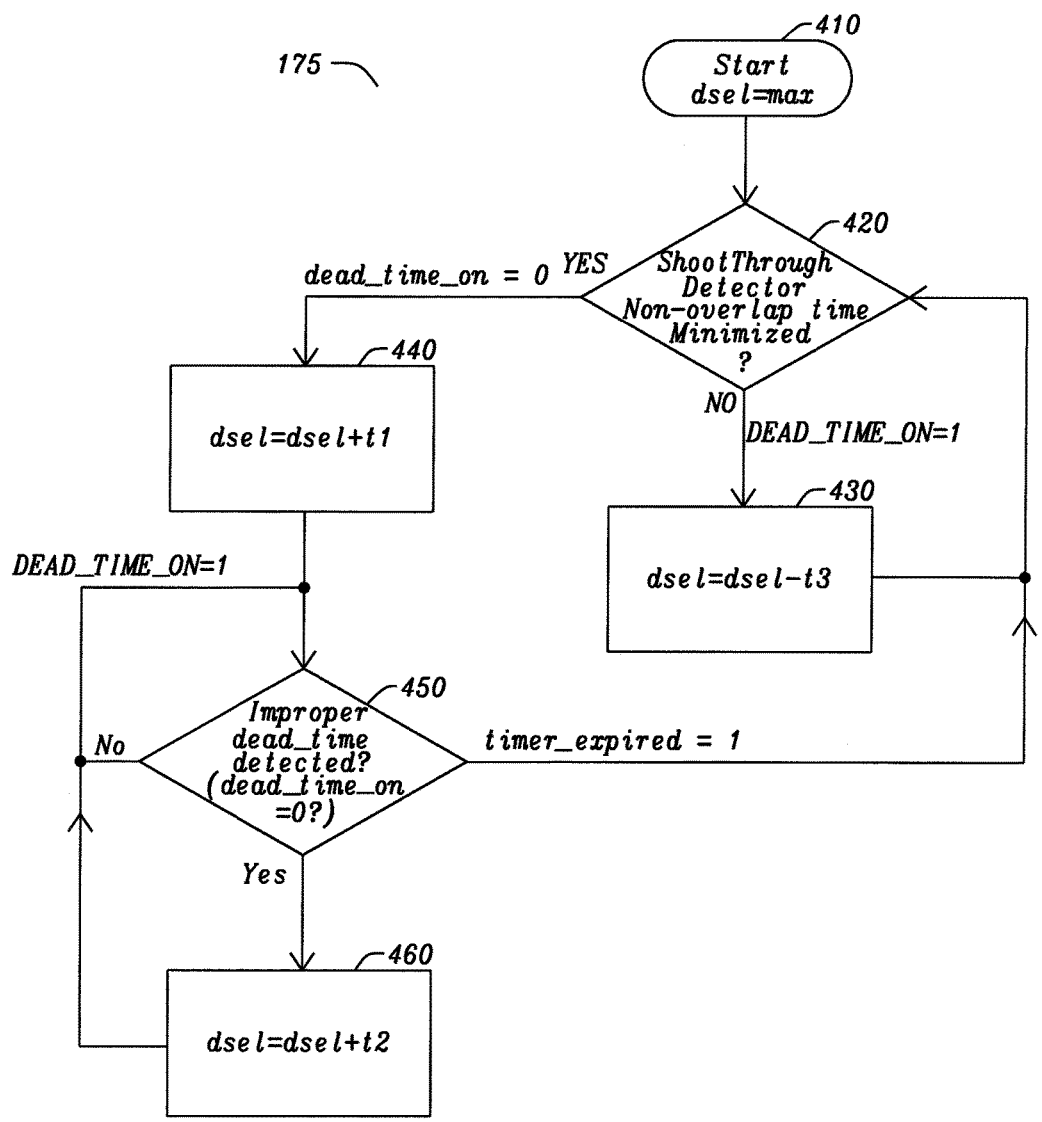
FIG. 4 is a flowchart of the adaptive dead time algorithm of FIG. 1a, embodying the principles of the disclosure.

FIG. 4 is a flowchart of adaptive dead time algorithm 175 of FIG. 1a. Similar to FIG. 3, detection within less than half a nanosecond, between the driver control signal and the LX node voltage, is feasible. The adaptive dead time algorithm checks the output of shoot-through detector 150 for LX_rising, and the output of shoot-through detector 200 for LX_falling. The algorithm generates a non-overlapping driver gate signal in driver logic 165, with a practical minimum dead time between the high and low side devices. The algorithm sets parameter DSEL2 from DEAD_TIME_ON2 for the high side device, and DSEL1 from DEAD_TIME_ON1 for the low side device, and generates a non-overlapping duration time.

In 410, at the start of the switching converter operation, DSEL is set to a maximum. In 420, if at an initial switching cycle, the output of the shoot-through detector DEAD_TIME_ON is logic 1 and there is enough dead time, the dead time is reduced. In 430, DSEL is decreased by t3, where t3 is a user programmable time for a decreasing time step. In subsequent switching cycles, a check 420 is made to determine if the non-overlap time is minimized, and if not, DSEL is decremented again by the time period t3. Once the non-overlap time is minimized, with DEAD_TIME_ON at zero, the algorithm moves to block 440.

In 440, the output of the shoot-through detector DEAD_TIME_ON is logic 0. The adaptive dead time algorithm will increase DSEL by time t1, where t1 is a user programmable time for added safety between the switching of the high side and low side devices. In decision block 450, this dead time will continue to be used for a non-overlapping duration until a predefined time duration timer_expired is set to logic 1. In 460, if there is an improper dead time detected, DEAD_TIME_ON=0, DSEL is increased by t2, where t2 is a user programmable time for an increasing time step, setting DEAD_TIME_ON=1.

Note that DEAD_TIME_ON is logic 1 when there is enough dead time, a portion of each switching cycle. After DSEL has been decreased enough, the shoot-through detector output will eventually be logic 0. At this point, the adaptive dead time algorithm has set the minimum non-overlapping time for the given load, process, supply and temperature conditions. For this setting of DSEL, no short circuit current occurs, and there is no efficiency loss associated with body diode conduction.

The required dead time can change over time, and if an improper dead time is detected in 450, the dead time duration is increased in 460, until the proper dead time duration is found. If the required dead time changes because of load, process, supply and temperature conditions, a sufficient dead time duration is found by adaptive dead time algorithm 175. When DEAD_TIME_ON=1 in 460, the dead time duration is long enough, and no changes are needed. DEAD_TIME_ON continues to be checked until DEAD_TIME_ON=0. The adaptive dead time algorithm may be implemented with a simple state machine or some type of processor.

Figure 5:
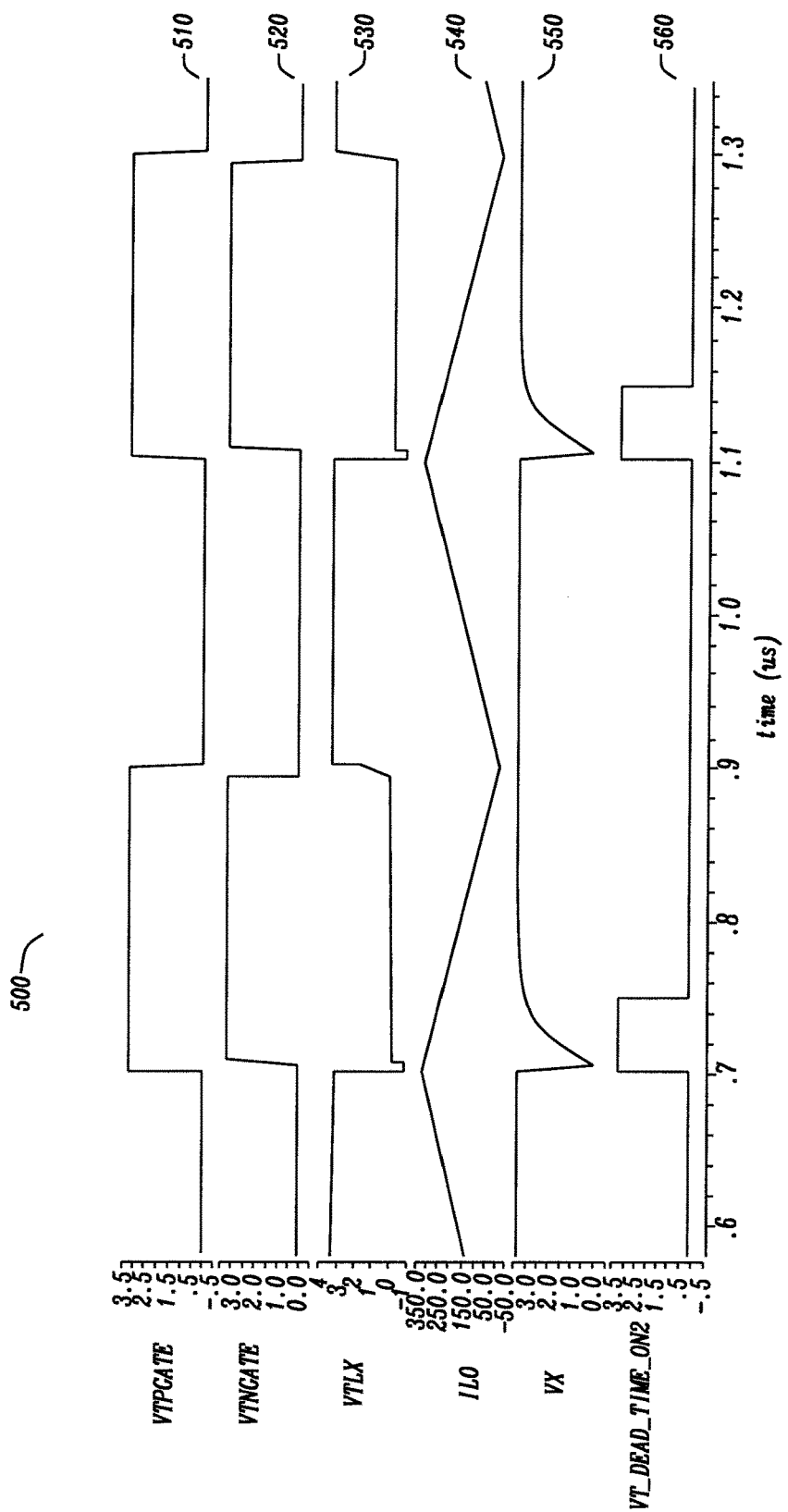
FIG. 5 illustrates a set of waveforms for the operating region given by the adaptive dead time algorithm of FIG. 4, where DEAD_TIME_ON turns on, embodying the principles of the disclosure.

FIG. 5 illustrates waveforms 500 for the operating region given by the adaptive dead time algorithm of FIG. 4, where DEAD_TIME_ON2 turns on. FIG. 5 corresponds to the FIG. 2A shoot-through detector for the falling edge of LX. Voltage signal VTPGATE 510 is the non-overlapping driver gate signal output of driver logic 165, for the high side device of the switching converter. Voltage signal VTNGATE 520 is the non-overlapping driver gate signal output of driver logic 165, for the low side device of the switching converter. FIG. 5 shows as the high side device turn off, and VTPGATE rises, LX voltage VTLX 530 falls, with a propagation delay of less than half a nanosecond. This is the case where voltage VTLX 530 falls, and PNP transistor output voltage VX 550 triggers VT_DEAD_TIME_ON2 560 to turn on. VT_DEAD_TIME_ON2, the output of shoot-through detector 150, remains on until being turned off by the adaptive dead time algorithm.

Figure 6:
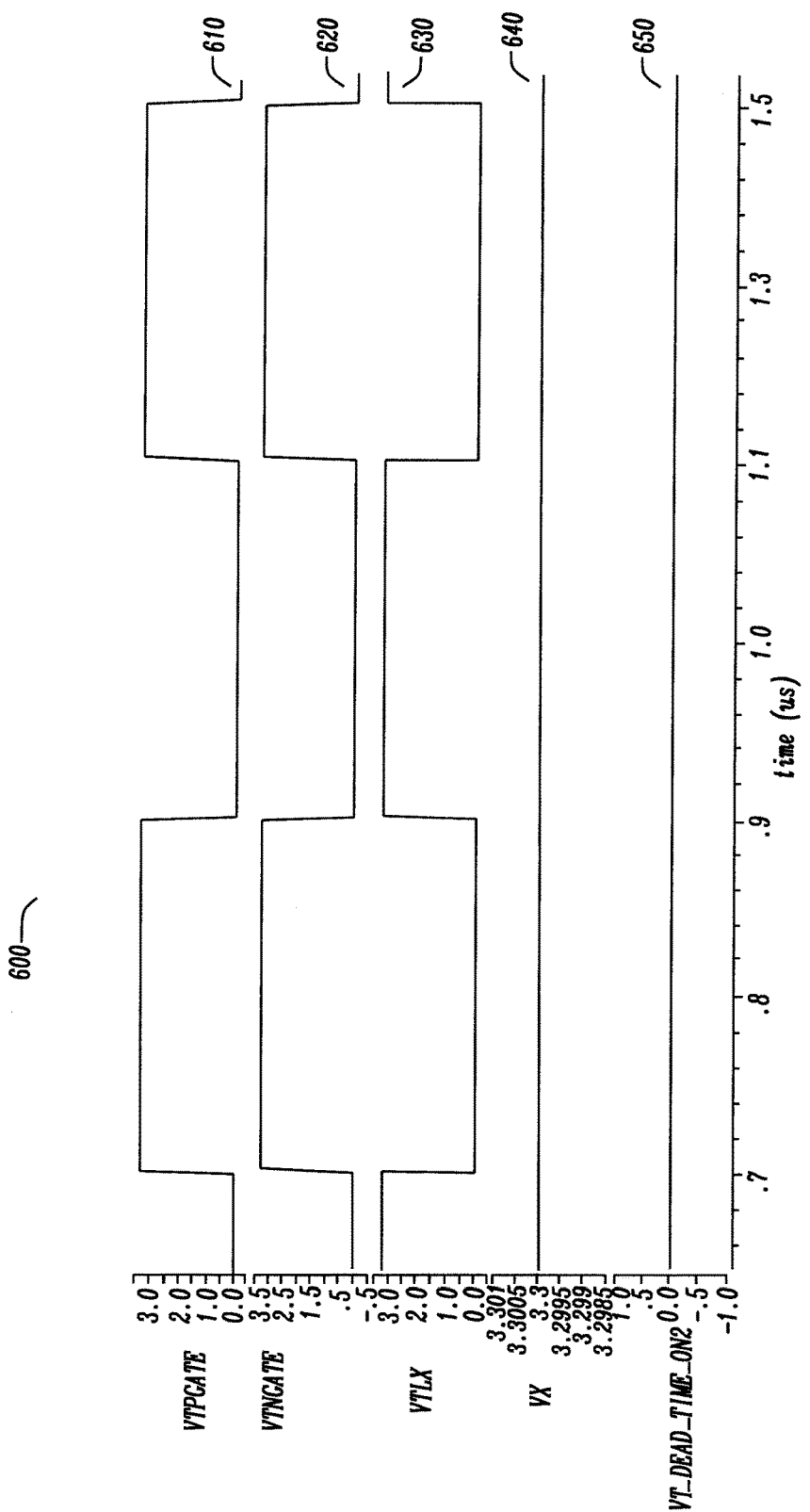
FIG. 6 illustrates waveforms for the operating region given by the adaptive dead time algorithm of FIG. 4, where DEAD_TIME_ON stays off, embodying the principles of the disclosure.

FIG. 6 illustrates waveforms 600, for the operating region given by the adaptive dead time algorithm of FIG. 4, where DEAD_TIME_ON2 stays off. Voltage signal VTPGATE 610 is the non-overlapping driver gate signal output of driver logic 165, for the high side device of the switching converter. Voltage signal VTNGATE 620 is the non-overlapping driver gate signal output of driver logic 165, for the low side of the switching converter. FIG. 6 shows as the high side device turns off and VTPGATE rises, LX voltage VTLX 630 falls. This is the case where PNP transistor output VX 640 never triggers VT_DEAD_TIME_ON2 650 to turn on. The shoot-through detector does not set a logic 1, and the adaptive dead time algorithm has determined the minimum non-overlapping time for the given load, process, supply and temperature conditions. When DSEL has been minimized, VT_DEAD_TIME_ON2 remains zero.

Figure 7:
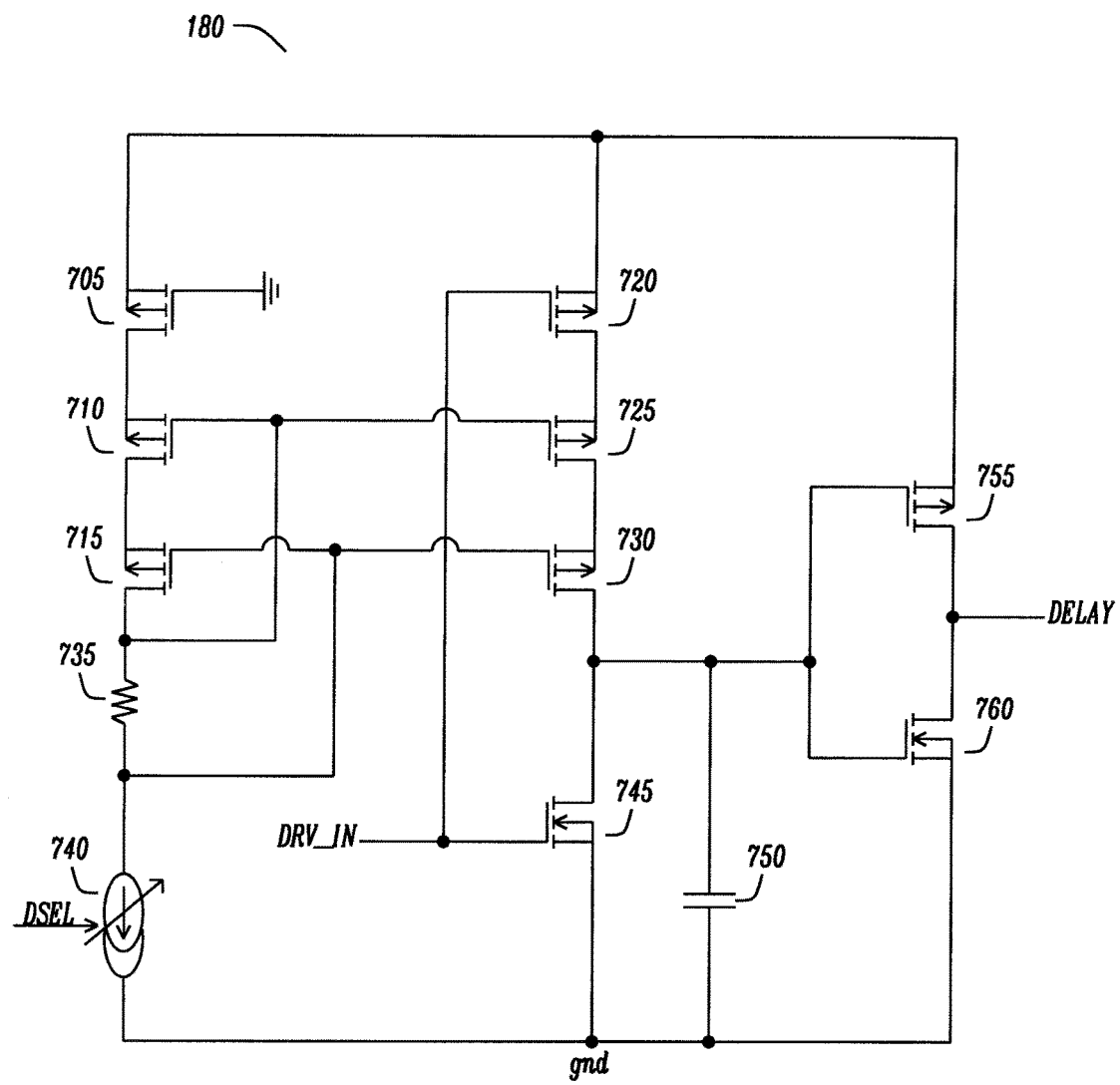
FIG. 7 shows the programmable delay cell implementation, generating the programmable time duration, for non-overlapping operation of the adaptive dead time algorithm, embodying the principles of the disclosure.

FIG. 7 shows programmable delay cell circuit implementation 180, generating the programmable time duration, for non-overlapping operation of the adaptive dead time algorithm. In this circuit, the programmable delay is generated by current digital to analog converter (DAC) 740, having the DRV_IN signal(s) as an input, the output being directed through switched current mirrors 705, 710, 715, 720, 725, and 730, from VDD to capacitor 750. The idea is to control current by the digital setting of the current DAC, so that the delay from supply input DRV_IN, across switch 745, to output DELAY is controlled. The switched current mirrors are connected to the current DAC across resistor 735, and the drain of high side device 755 is connected to the drain of low side device 750 at DELAY. Note that DRV_IN of FIG. 7 corresponds to HS_DRV_IN of Driver Logic 165 in FIG. 1b, for high side control PGATE, and to LS_DRV_IN of Driver Logic 165 in FIG. 1b, for low side control NGATE. DELAY of FIG. 7 corresponds to DELAY2 for the high side device, and to DELAY1 for the low side device, in FIG. 1a.

Since detection of the falling and rising edges of LX occurs at different times, a single programmable delay cell can be used to generate both DELAY1 and DELAY2. Alternatively, two programmable delay cells may be used, one each for the LX falling and rising edges.

Current source 740 is programmable, in response to DSEL of FIG. 4, and is set to the current needed to charge capacitor 750. The programmable delay cell circuit is a simple buffer cell, with some additional delay. (Current source 740)*(charge capacitor 750) defines the delay from DRV_IN to DELAY.

Figure 8:
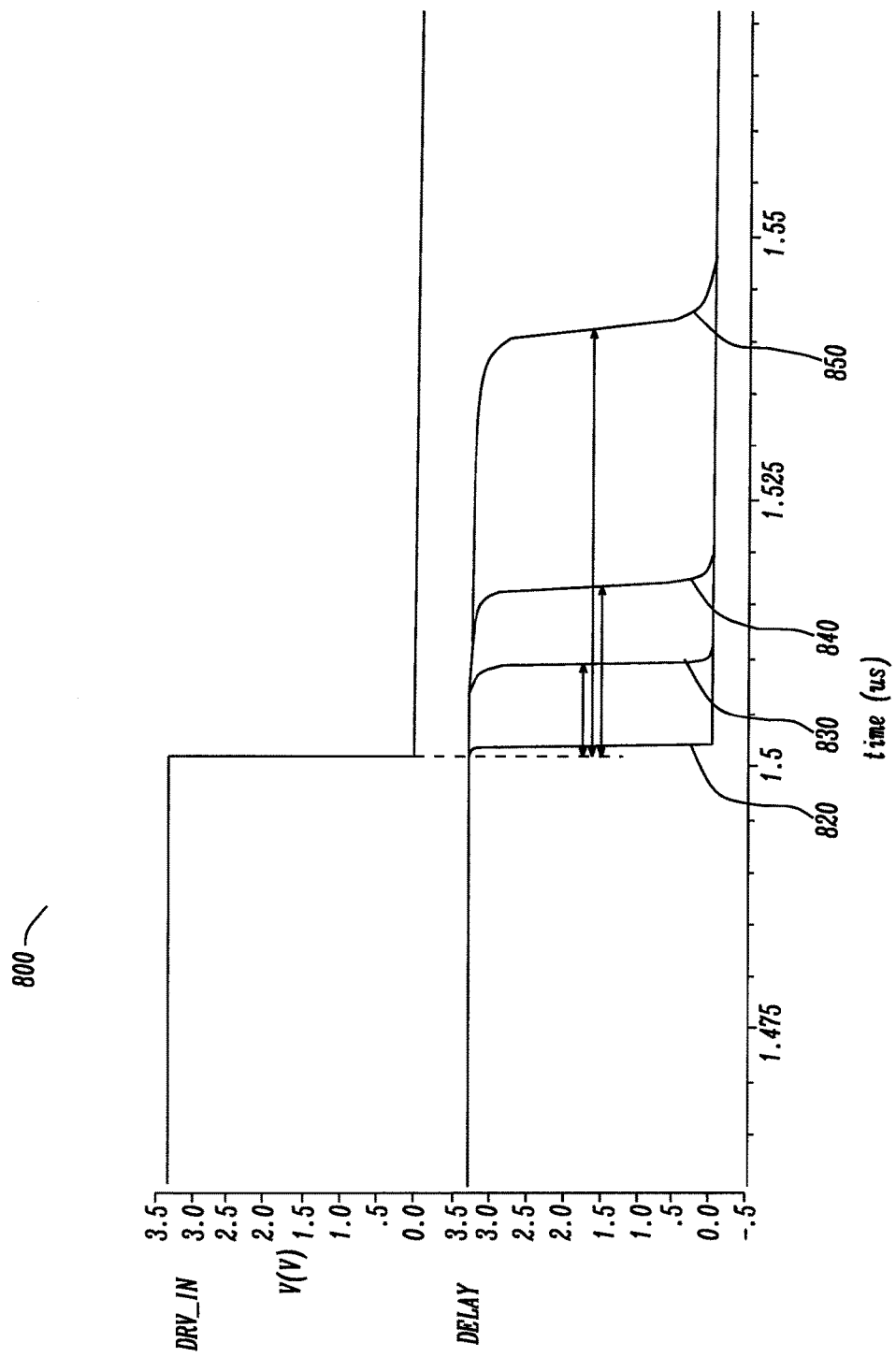
FIG. 8 shows simulation results for the programmable delay cell of FIG. 7, for the non-overlapping operation of the adaptive dead time algorithm, embodying the principles of the disclosure.

FIG. 8 shows simulation results 800 for the programmable delay cell of FIG. 7, for the non-overlapping operation of the adaptive dead time algorithm. The programmable delay cell time is observed for delays of 1 ns in 820, 8.85 ns in 830, 16.24 ns in 840 and 40.5 ns in 850, as DRV_IN and DELAY vary from 3.3V to 0. The current DAC of FIG. 7 may have a 6 bit resolution for the defined range of programmable delay.

Figure 9:
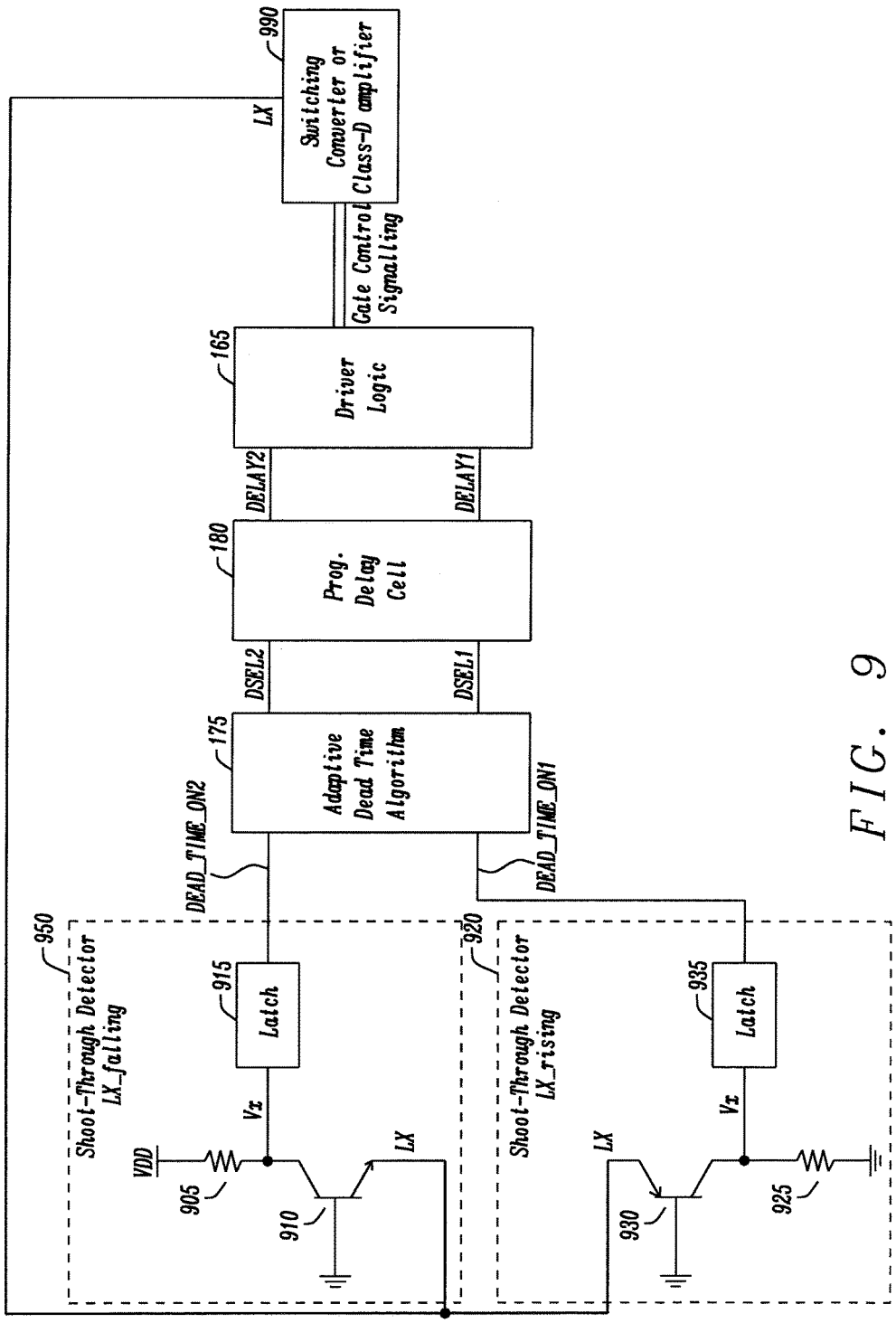
FIG. 9 illustrates an alternative version of the shoot-detector circuit of FIG. 2a, removing the shunt capacitor, gain stage and switch, embodying the principles of the disclosure.

FIG. 9 illustrates alternative versions of the shoot-through detector circuit. Shoot-through detector 950 comprises common base NPN transistor 910, whose collector is connected to $V_{DD}$ across resistor 905, and whose emitter is LX node. The output of the detector is latched in 915, and sent to adaptive dead time algorithm 175, via signal DEAD_TIME_ON2 for LX_falling.

Shoot-through detector 920 comprises common base PNP transistor 930, whose emitter is connected to LX node, and whose collector is connected to ground across resistor 925. The output of the detector is latched in 935, and sent to adaptive dead time algorithm 175, via signal DEAD_TIME_ON1 for LX_rising.

The adaptive dead time algorithm generates DSEL2, to delay the high side device from switching, and DSEL1, to delay the low side device from switching. Both DSEL2 and DSEL1 are input to Programmable Delay Cell 180. The programmable delay cell provides DELAY2, to the high side gate controls, and DELAY1, to the low side gate controls, of Driver Logic 165. The gate control outputs of the driver logic are input to 990, representing the output stage of a synchronous switching converter or a class-D type amplifier.

Figure 10:
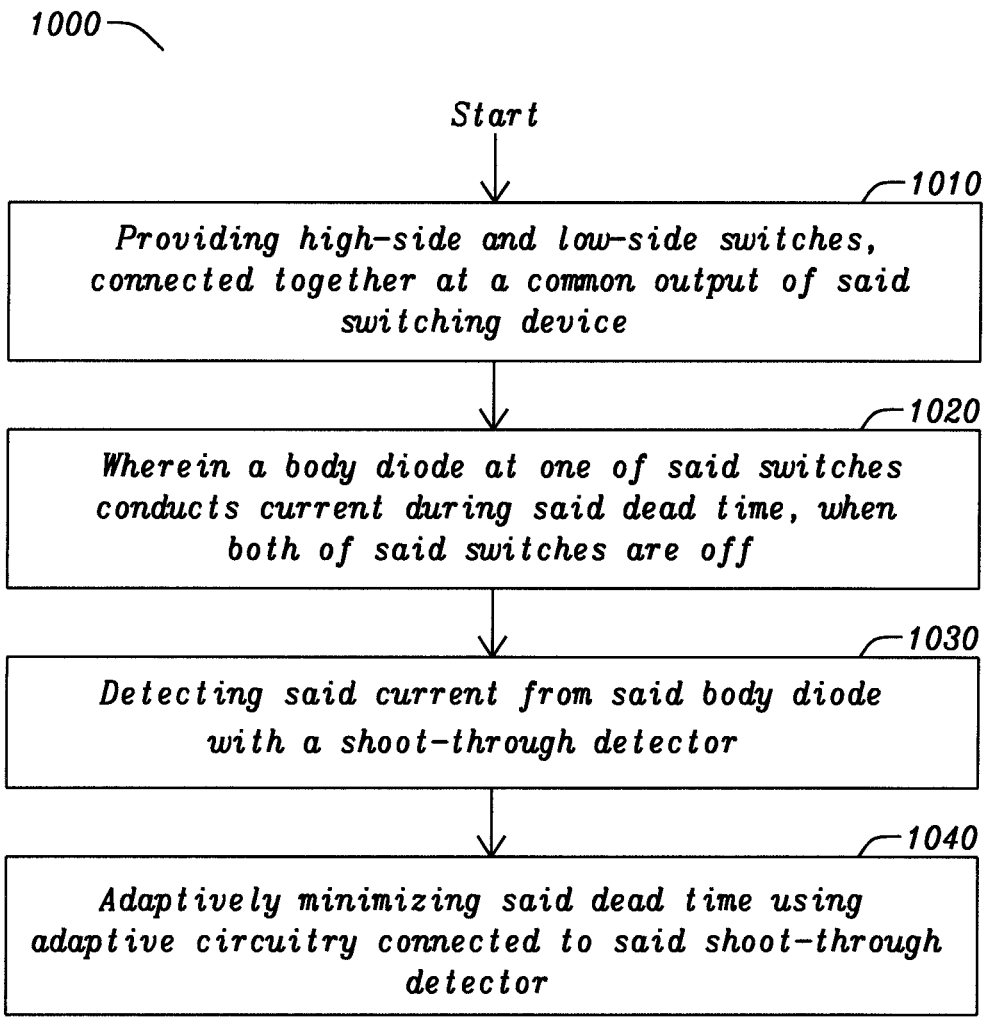
FIG. 10 is a flow chart of an adaptive control method alternative for generating non-overlapping time between the high side and low side devices in a DC-DC switching power converter, embodying the principles of the disclosure.

FIG. 10 is flow chart 1000, for a method of adaptively minimizing dead times when changing output switch states of a switching device. The steps include 1010, providing high-side and low-side switches, connected together at a common output of the switching device. In step 1020, a body diode at one of the switches conducts current during the dead time, when both of the switches are off. In step 1030, the current is detected from the body diode with a shoot-through detector. In step 1040, the dead time is adaptively minimized, using adaptive circuitry connected to the shoot-though detector.

The advantages of one or more embodiments of the present disclosure include the design of a DC-DC Switching Converter with exceptionally good non-overlapping behavior of the high side and low side devices. The proposal allows for a DC-DC Switching Converter to have reduced process sensitivity for the given load current, temperature, supply and process conditions.

While this invention has been particularly shown and described with reference to the preferred embodiments thereof, it will be understood by those skilled in the art that various changes in form and details may be made without departing from the spirit and scope of the invention.

The invention claimed is:

1. A switching device, having an adaptively minimized dead times when changing output switch states, comprising:
    high-side and low-side switches, connected together at a common output of said switching device;
    wherein a body diode at one of said switches conducts current during said dead time, when both of said switches are off;
    a shoot-through detector configured to detect said current from said body diode, wherein said shoot-through detector comprises:
        an input which is said common output of said switching device;
        a bipolar device configured to sense a rising or falling edge of said common output; and
        a latch configured to change state based on said rising or falling edge and to output a dead time-on pulse having a duration of a current said dead time; and
    adaptive circuitry connected to said shoot-though detector configured to adaptively minimize said dead time.

2. The switching device of claim 1, further comprising a programmable delay cell connected to said adaptive circuitry.

3. The switching device of claim 2, wherein said programmable delay cell is configured to delay said minimized dead time, for said rising or said falling edge of said common output.

4. The switching device of claim 2, wherein said programmable delay cell comprises a current DAC, switched current mirrors, and a capacitor.

5. The switching device of claim 2, wherein said programmable delay cell comprises a delay mechanism other than a current DAC.

6. The switching device of claim 1, further comprising driver logic connected to said programmable delay cell.

7. The switching device of claim 6, wherein said driver logic is configured to generate control signals for said high-side and said low-side switches, for said common output of said switching device.

8. The switching device of claim 6, wherein said driver logic AND gate has inputs at a control signal and a delay control signal output from said programmable delay cell.

9. The switching device of claim 1, wherein said switching device comprises a synchronous switching converter.

10. The switching device of claim 1, wherein said switching device comprises a class-D amplifier.

11. The switching device of claim 1, wherein said input is the falling edge of said common output of said switching device.

12. The switching device of claim 11, wherein said bipolar device comprises a NPN transistor.

13. The switching device of claim 11, wherein the collector of said bipolar device is connected to a resistor and an amplifier, and the emitter connected to a capacitor and the drain of an N channel MOSFET.

14. The switching device of claim 11, wherein said latch is connected to said amplifier and said capacitor is connected to said common output of said switching device.

15. The switching device of claim 1, wherein said input is the rising edge of said common output of said switching device.

16. The switching device of claim 15, wherein said bipolar device comprises a PNP transistor.

17. The switching device of claim 15, wherein the collector of said bipolar device is connected to a resistor and an amplifier, and the emitter connected to a capacitor and the drain of a P channel MOSFET.

18. The switching device of claim 15, wherein said latch is connected to said amplifier and said capacitor is connected to said common output of said switching device.

19. A method of adaptively minimizing a dead times when changing output switch states of a switching device, comprising the steps of:
    providing high-side and low-side switches, connected together at a common output of said switching device;
    wherein a body diode at one of said switches conducts current during said dead time, when both of said switches are off;
    detecting said current from said body diode with a shoot-through detector, wherein said shoot-through detector changes state based on a rising or falling edge, and outputs a dead time-on pulse having a duration of a current said dead time; and
    adaptively minimizing said dead time using adaptive circuitry connected to said shoot-though detector.

20. The method of claim 19, wherein said shoot-through detector receives said common output of said switching device.

21. The method of claim 19, wherein said shoot-through detector senses said rising or falling edge of said common output.

22. The method of claim 19, wherein a programmable delay cell delays said minimized dead time, for said high-side and said low-side switches.

23. The method of claim 19, wherein driver logic generates control signals for said high-side and said low-side switches, for said common output of said switching device.

\* \* \* \* \*